(12) United States Patent
Eberlein et al.

(10) Patent No.: US 8,944,772 B2
(45) Date of Patent: Feb. 3, 2015

(54) REPLACEMENT PART FOR A GAS TURBINE BLADE OF A GAS TURBINE, GAS TURBINE BLADE AND METHOD FOR REPAIRING A GAS TURBINE BLADE

(75) Inventors: Armin Eberlein, Klosterlechfeld (DE); Albert-Valentin Schneider, Munich (DE)

(73) Assignee: MTU Aero Engines GmbH, Munich (DE)

( * ) Notice: Subject to any disclaimer, the term of this patent is extended or adjusted under 35 U.S.C. 154(b) by 882 days.

(21) Appl. No.: 13/062,939

(22) PCT Filed: Sep. 9, 2009

(86) PCT No.: PCT/DE2009/001280
§ 371 (c)(1),
(2), (4) Date: Jul. 1, 2011

(87) PCT Pub. No.: WO2010/028641
PCT Pub. Date: Mar. 18, 2010

(65) Prior Publication Data
US 2011/0250072 A1    Oct. 13, 2011

(30) Foreign Application Priority Data
Sep. 13, 2008    (DE) .......................... 10 2008 047 043

(51) Int. Cl.
*F01D 5/20*    (2006.01)
*F01D 5/00*    (2006.01)
*B23P 6/00*    (2006.01)

(52) U.S. Cl.
CPC ................ *F01D 5/005* (2013.01); *B23P 6/005* (2013.01)
USPC .................................................... 416/223 A

(58) Field of Classification Search
USPC .............. 416/223 A, 224, 213 R, 241 R, 228; 415/115, 191; 29/889.1, 889.21, 29/889.22, 889.23, 889.3, 889.7, 889.71, 29/889.72, 889.721, 888.025
See application file for complete search history.

(56) References Cited

U.S. PATENT DOCUMENTS

| | | | | |
|---|---|---|---|---|
| 3,899,267 A | * | 8/1975 | Dennis et al. | 416/92 |
| 4,118,147 A | * | 10/1978 | Ellis | 416/230 |
| 4,169,020 A | * | 9/1979 | Stalker et al. | 205/110 |
| 4,232,995 A | * | 11/1980 | Stalker et al. | 415/173.4 |
| 4,247,254 A | * | 1/1981 | Zelahy | 416/97 R |

(Continued)

FOREIGN PATENT DOCUMENTS

| | | |
|---|---|---|
| DE | 42 25 443 C2 | 2/1994 |
| DE | 199 63 714 A1 | 7/2001 |

(Continued)

OTHER PUBLICATIONS

European Search Report, dated Sep. 11, 2012, 4 pages.

*Primary Examiner* — Edward Look
*Assistant Examiner* — Eldon Brockman
(74) *Attorney, Agent, or Firm* — Crowell & Moring LLP

(57) ABSTRACT

A replacement part for a gas turbine blade is disclosed. The replacement part is designed to replace a removed portion of the blade, the portion including a section of the blade tip and a section of the leading edge and/or the trailing edge, and the replacement part having at least one joining side with which it can be brought to contact with the blade that is reduced by the removed portion and joined therewith. The joining side has at least one section, the cross-section of which is U-shaped.

10 Claims, 4 Drawing Sheets

(56) References Cited

U.S. PATENT DOCUMENTS

| | | | | |
|---|---|---|---|---|
| 4,390,320 A * | 6/1983 | Eiswerth | ............... | 416/97 R |
| 4,487,550 A * | 12/1984 | Horvath et al. | ............... | 416/92 |
| 4,540,339 A * | 9/1985 | Horvath | ............... | 416/92 |
| 4,589,824 A * | 5/1986 | Kozlin | ............... | 416/97 R |
| 4,594,761 A * | 6/1986 | Murphy et al. | ............... | 29/889.71 |
| 4,712,980 A * | 12/1987 | Gely et al. | ............... | 416/224 |
| 4,728,262 A * | 3/1988 | Marshall | ............... | 416/224 |
| 4,795,313 A * | 1/1989 | Coulon | ............... | 416/224 |
| 4,802,828 A * | 2/1989 | Rutz et al. | ............... | 416/241 B |
| 5,062,205 A * | 11/1991 | Fraser | ............... | 29/889.7 |
| 5,476,363 A * | 12/1995 | Freling et al. | ............... | 415/173.1 |
| 5,551,840 A * | 9/1996 | Benoit et al. | ............... | 416/241 B |
| 5,584,663 A * | 12/1996 | Schell et al. | ............... | 416/241 R |
| 5,782,607 A * | 7/1998 | Smith et al. | ............... | 416/224 |
| 5,794,338 A * | 8/1998 | Bowden et al. | ............... | 29/889.1 |
| 5,846,057 A * | 12/1998 | Ferrigno et al. | ............... | 416/241 R |
| 5,896,657 A * | 4/1999 | Beyer et al. | ............... | 29/889.71 |
| 6,178,633 B1 * | 1/2001 | Yamane | ............... | 29/889.7 |
| 6,190,129 B1 * | 2/2001 | Mayer et al. | ............... | 416/97 R |
| 6,224,336 B1 * | 5/2001 | Kercher | ............... | 416/97 R |
| 6,238,187 B1 * | 5/2001 | Dulaney et al. | ............... | 416/241 R |
| 6,461,107 B1 * | 10/2002 | Lee et al. | ............... | 416/96 R |
| 6,468,040 B1 * | 10/2002 | Grylls et al. | ............... | 416/224 |
| 6,494,677 B1 * | 12/2002 | Grady | ............... | 415/209.4 |
| 6,508,000 B2 * | 1/2003 | Burke et al. | ............... | 29/889.1 |
| 6,532,656 B1 * | 3/2003 | Wilkins et al. | ............... | 29/889.1 |
| 6,575,702 B2 * | 6/2003 | Jackson et al. | ............... | 416/96 R |
| 6,595,749 B2 * | 7/2003 | Lee et al. | ............... | 416/97 R |
| 6,602,052 B2 * | 8/2003 | Liang | ............... | 416/97 R |
| 6,652,235 B1 * | 11/2003 | Keith et al. | ............... | 416/92 |
| 6,733,232 B2 * | 5/2004 | Ingistov et al. | ............... | 415/115 |
| 6,908,288 B2 * | 6/2005 | Jackson et al. | ............... | 416/224 |
| 6,994,920 B2 * | 2/2006 | Trewiler | ............... | 428/670 |
| 7,001,151 B2 * | 2/2006 | Wang et al. | ............... | 416/92 |
| 7,290,986 B2 * | 11/2007 | Stegemiller et al. | ............... | 416/92 |
| 7,547,188 B2 * | 6/2009 | Imano et al. | ............... | 415/200 |
| 7,556,477 B2 * | 7/2009 | Sherlock et al. | ............... | 416/224 |
| 7,600,977 B2 * | 10/2009 | Shadbolt et al. | ............... | 416/224 |
| 7,640,661 B2 * | 1/2010 | Despreaux et al. | ............... | 29/889.7 |
| 7,695,248 B2 * | 4/2010 | Mons et al. | ............... | 416/97 R |
| 7,832,988 B2 * | 11/2010 | Bergander et al. | ............... | 416/233 |
| 7,841,834 B1 * | 11/2010 | Ryznic | ............... | 416/224 |
| 8,049,132 B2 * | 11/2011 | Bouet et al. | ............... | 219/121.64 |
| 8,091,228 B2 * | 1/2012 | Hiskes | ............... | 29/889.1 |
| 2003/0082048 A1 * | 5/2003 | Jackson et al. | ............... | 415/115 |
| 2003/0082053 A1 | 5/2003 | Jackson et al. | | |
| 2003/0082054 A1 * | 5/2003 | Grylls et al. | ............... | 416/224 |
| 2004/0126492 A1 * | 7/2004 | Weaver et al. | ............... | 427/250 |
| 2005/0091848 A1 * | 5/2005 | Nenov et al. | ............... | 29/889.71 |
| 2007/0258825 A1 * | 11/2007 | Shadbolt et al. | ............... | 416/223 R |
| 2010/0050435 A1 * | 3/2010 | Ahmad Zainuddin et al. | ............... | 29/889.1 |

FOREIGN PATENT DOCUMENTS

| | | |
|---|---|---|
| EP | 1 607 169 A1 | 12/2005 |
| GB | 2 269 126 A | 2/1994 |
| JP | 61-95769 A | 5/1986 |

* cited by examiner

REPLACEMENT PART FOR A GAS TURBINE BLADE OF A GAS TURBINE, GAS TURBINE BLADE AND METHOD FOR REPAIRING A GAS TURBINE BLADE

BACKGROUND AND SUMMARY OF THE INVENTION

This application claims the priority of International Application No. PCT/DE2009/001280, filed Sep. 9, 2009, and German Patent Document No. 10 2008 047 043.0, filed Sep. 13, 2008, the disclosures of which are expressly incorporated by reference herein.

The invention relates to a replacement part for a gas turbine blade, a gas turbine blade as well as a method for repairing a gas turbine blade.

As is known, in the field of gas turbines, particularly in the field of aircraft engines, the blades of the rotors of a compressor or a turbine get damaged after a specific utilization or from the effect of foreign bodies.

The so-called patching has gained acceptance in the case of integral rotors, such as BLISK (Germanization of "bladed disk") or BLING (Germanization of "bladed ring") in order to avoid having to replace the entire rotor or to avoid having to replace complete blades in the case of rotors having individual, separate blades. In the case of patching, a section of a blade is first removed and then replaced by a replacement part section. This is normally accomplished by welding on a replacement part section after the blade section has been removed. The replacement part section in this case, may already have the exact dimensions of the to-be-replaced section; however, normally the replacement part section has a certain excess, which will be removed in the course of post-processing to achieve the desired geometry. Depending upon the blade material and/or blade geometry, welding defects in the form of cracks may arise due to unfavorable conditions at the transition between the patch and blade.

With this as the background, the object of the invention is establishing a possibility to create repaired gas turbine blades with an almost defect-free welded connection.

Thus, a replacement part for a gas turbine blade is in particular provided. The gas turbine for this gas turbine blade or to which this gas turbine blade belongs may be configured as an aircraft engine for example. The replacement part is designed in particular to replace a to-be-replaced, removed portion of the gas turbine blade. In this case, the to-be-replaced portion features a section of the blade tip and a section of at least one edge. This edge is an edge, which belongs to a group of edges, wherein this group of edges includes the leading edge and the trailing edge of the gas turbine blade. The replacement part furthermore has at least one side, which may be designated or is designated as the joining side. This joining side of the replacement part is the side of the replacement part, with which the replacement part can be brought into contact with the gas turbine blade or the blade remnant or the blade stub that is reduced by the removed portion and joined to this gas turbine blade. For example, the replacement part may be configured like a type of triangle, wherein one side is provided for configuring an edge or an edge section, in particular a leading edge or trailing edge or section thereof, and wherein a different side is provided for configuring the blade tip or a section of the blade tip, and wherein a third side, which is different than the two aforementioned ones, is configured as the joining side. In this case, it may be provided that there is an excess in the region of the to-be-formed leading or trailing edge and/or in the region of the to-be-formed blade tip and, if applicable, in other regions.

It is provided pursuant to the invention that the joining side have at least one first section, in which this joining side is U-shaped in cross section.

In this case, it may be provided that the joining side is U-shaped in cross section continuously along this side. However, it may also be provided that the joining side is only U-shaped in sections or partially along its side. The U-shape is in particular such that it forms a base or bottom as well as two flanges or walls running on both sides of this base or bottom. It may be provided that the base or the bottom in this case is configured to be flat or is configured to be essentially flat. Furthermore, it may be provided that the walls or flanges having the U-shape are equally wide, and namely as viewed in the longitudinal direction of extension of the joining side. However, it may also be provided that the walls that form the U-shape are of different widths in the longitudinal direction of extension of the joining side. The latter may be the case for example with a preferred embodiment in which, attached to the first section, which forms a U-shape in cross section, is a second section of the joining side, which is L-shaped in cross section. In the case of such an embodiment, the one U-shaped flange is no longer in the region of the L-shape, while the other flange passes through to form the L-shape.

In the case of an embodiment, in which the cross sections of the joining side change along the joining side, it may be provided that a U-shape is provided in sections and an L-shape is provided in sections. In this case, it may be provided that the U-shape and the L-shape are directly adjacent to one another.

It is provided in an especially preferred embodiment that the walls or flanges, which run on both sides of the base of the U-shape, are such that at least one of these walls or one of these flanges has a thickening of its wall thickness. This may be such that the thickening of the wall thickness is given as compared to the other flange.

It may also be provided that thickening is present as related to the wall thickness of the same wall. Such an embodiment with a thickening may be provided if the joining side is continuously U-shaped in cross section. Such an embodiment with a thickening may also be provided with a design in which the cross section of the joining side is U-shaped in sections and L-shaped in sections. In this case, it may be provided, for example, that the thickening is present in the region of the flange with the L-shape.

In an advantageous embodiment, at least one flange, which is provided to form the U-shape and is provided without lengthening such a flange with a U-shape, is configured such that it, as viewed in the longitudinal direction of joining side, has at least one region, in which the flange extends longer in the direction as viewed transverse to the base of the U-shape and transverse to the longitudinal direction of joining side than in another region located in the direction of this longitudinal side. These length differences exist in particular in the direction which is located perpendicular to the base and perpendicular to the addressed longitudinal extension direction of the joining side. It may be provided, for example, that a bend be provided on a flange end facing away from the base in its progression in the longitudinal direction of the joining side.

In an advantageous embodiment, the joining side essentially runs straight along its longitudinal direction of extension. It may also be provided that the joining side is in some sections U-shaped in cross section and in some sections L-shaped in cross section, and a region is provided between this L-shape and U-shape (as viewed in the direction of the joining side) that is configured to be neither U-shaped nor L-shaped.

Furthermore a gas turbine blade, particularly a blade for an aircraft engine, is provided. The gas turbine blade has a blade stub or a blade remnant and replacement part formed on this blade stub or on this blade remnant via a welded connection. The replacement part may be configured for example in a manner that is in accordance with the invention.

It may be provided that the second section that is L-shaped in cross section be adjacent on one edge of a group of edges, which group of edges includes the leading edge and the trailing edge of the gas turbine blade.

However, it may also be provided that the region of the flange forming the thickening of the wall thickness is adjacent to an edge of a group of edges, which group of edges includes the leading edge and the trailing edge of the gas turbine blade.

Furthermore, it may be provided that a region, in which the side of an L-shaped or a U-shaped flange facing away from the base is removed further from this base than in another region spaced apart in the longitudinal direction of the joining side, is adjacent on an edge of the group of edges, which group of edges includes the leading edge and the trailing edge of the gas turbine blade.

The invention is described in more detail in the following in terms of exemplary embodiments without restricting the invention thereto.

DETAILED DESCRIPTION OF THE DRAWINGS

FIGS. 1 through 4 show four exemplary embodiments of a replacement part 1 pursuant to the invention. The same parts or sections are identified in the figures with the same reference numbers.

The replacement part 1 is designed for a gas turbine blade, in particular for a blade of an aircraft engine. The gas turbine blade may be a compressor blade or a turbine blade for example. The replacement part 1 is designed to replace a to-be-replaced, removed portion of the blade, wherein the to-be-replaced portion features a section of the blade tip and a section of at least one edge. In this case, one edge may be in particular a leading edge or a trailing edge of the blade. The replacement part has at least one side 10, which is a joining side. This joining side 10 is designed to be brought into contact with the blade that has a removed portion and to be joined to this blade with the joining side 10. The joining side 10 has at least one first section 12, in which this joining side 10 is U-shaped in cross section.

Figure 1:
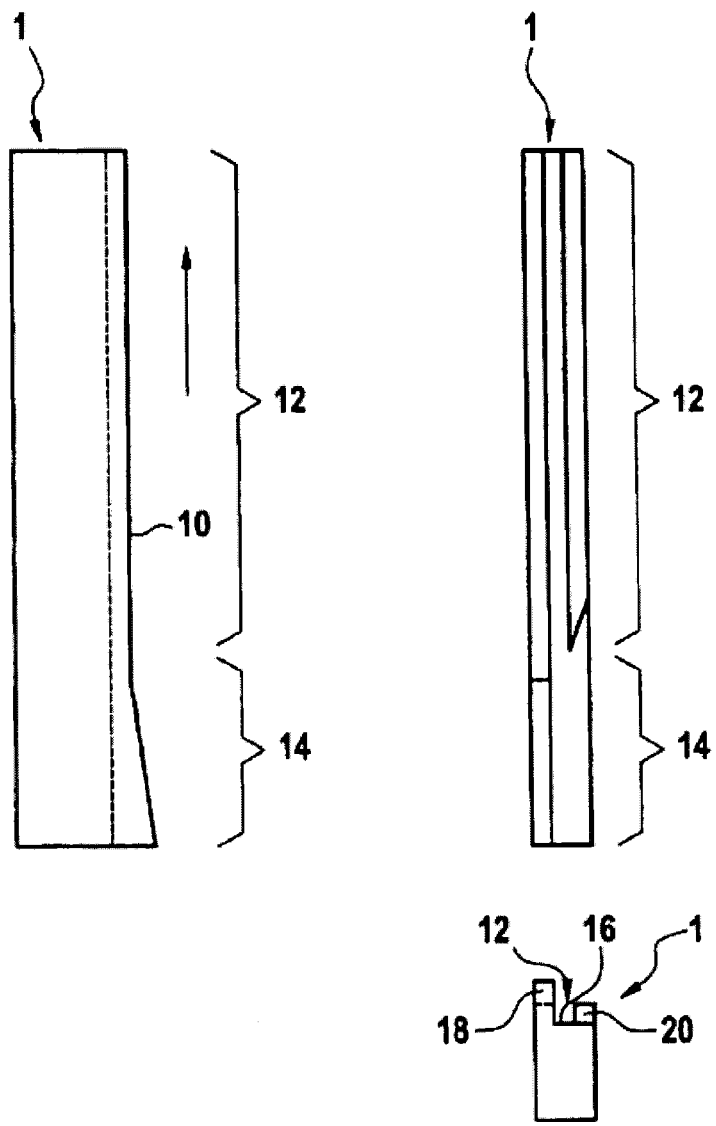
FIG. 1 illustrates various views of a first exemplary replacement part in accordance with the invention, which can also be a part of an exemplary blade in accordance with the invention and/or can be used for an exemplary method in accordance with the invention.
Figure 2:
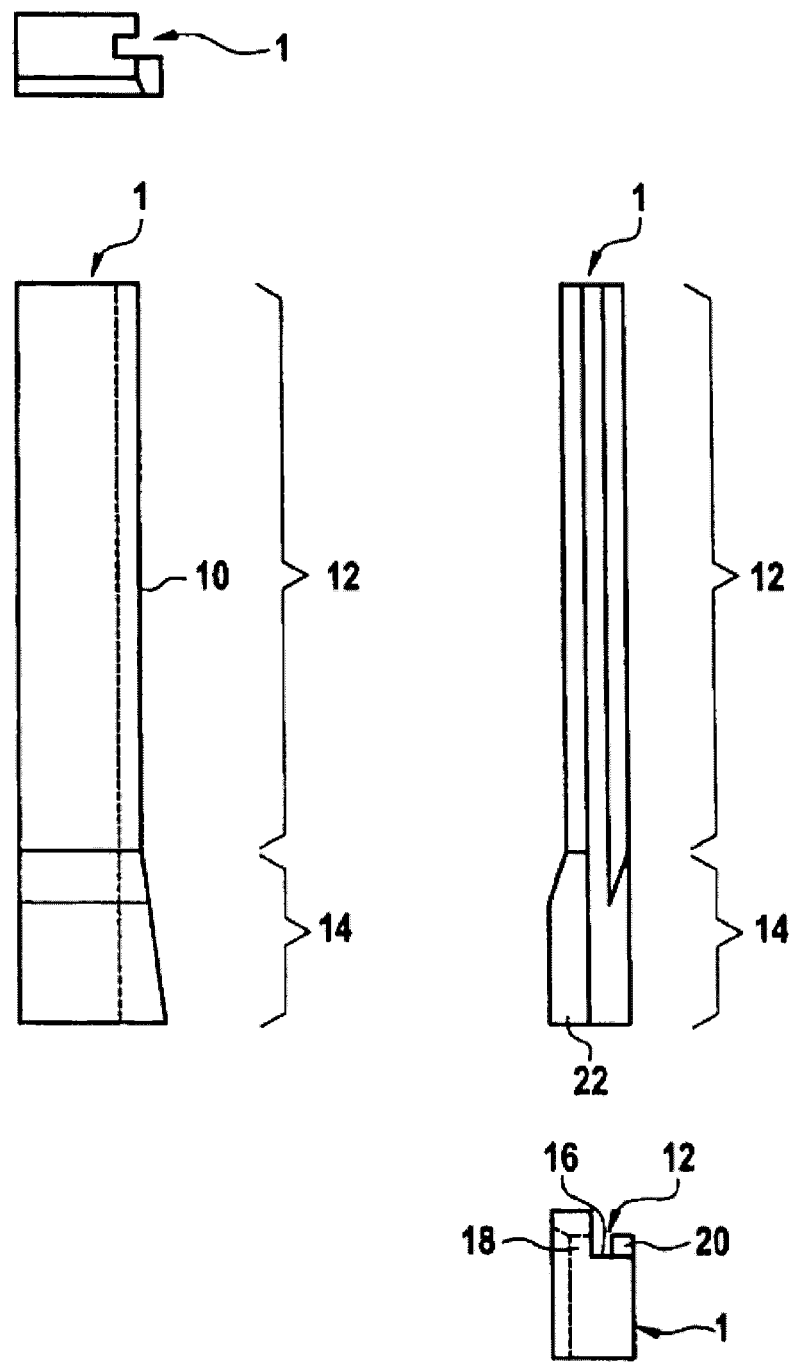
FIG. 2 illustrates various views of a second exemplary replacement part pursuant to the invention, which can also be a part of an exemplary blade pursuant to the invention and/or can be used for an exemplary method pursuant to the invention.
Figure 3:
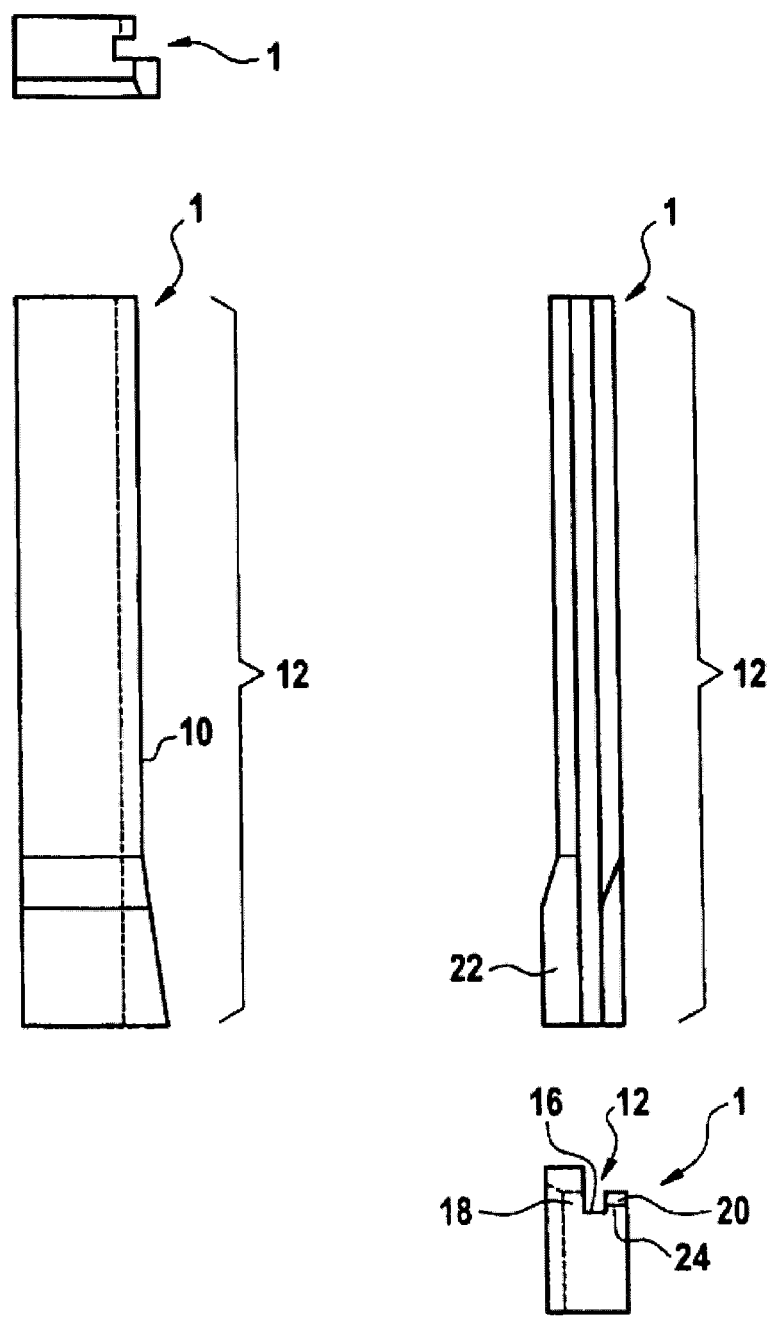
FIG. 3 illustrates various views of a third exemplary replacement part pursuant to the invention, which can also be a part of an exemplary blade pursuant to the invention and/or can be used for an exemplary method pursuant to the invention.
Figure 4:
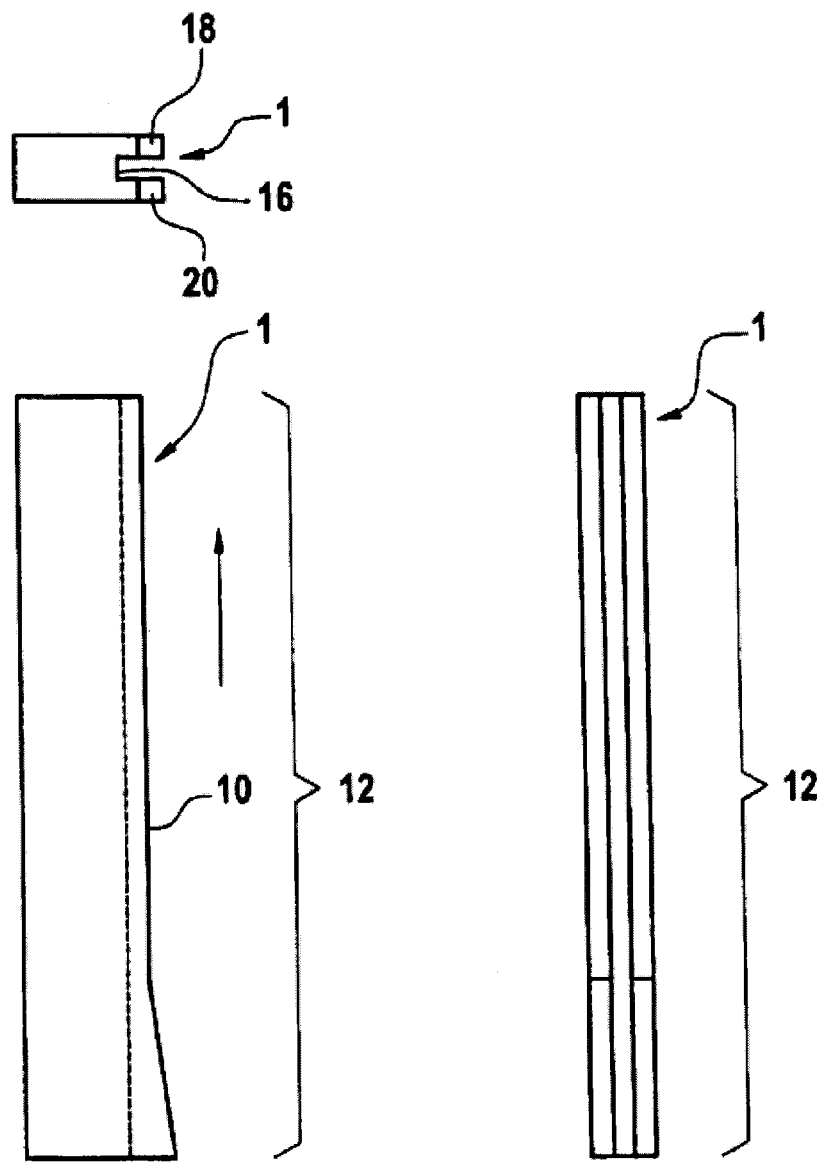
FIG. 4 illustrates various views of a fourth exemplary replacement part pursuant to the invention, which can also be a part of an exemplary blade pursuant to the invention and/or can be used for an exemplary method pursuant to the invention.

As the comparison of FIGS. 1 through 4 shows, in the case of the embodiments according to FIGS. 3 and 4, the joining side 10 is U-shaped along its entire length. In the case of the embodiment according to FIGS. 1 and 2, only one section of the joining side 10 of the replacement part 1 is U-shaped in cross section.

It is respectively provided in the case of the embodiment according to FIGS. 1 and 2 that the joining side 10 has a first section 12, in which the joining side 10 is U-shaped in cross section, as well as a defined stepless transition to the second section 14, in which this joining side 10 is essentially L-shaped in cross section.

With respect to the U-shaped cross section of the joining side, in the figures the first flange of this U-shape is designated by 18, the second flange of this U-shape by 20 and the base of this U-shape by 16.

It should be noted that in the region of the addressed L-shapes there is only the first flange along with the base 16, and the second flange 20 is missing.

In the case of the embodiment according to FIG. 2, where the cross section of the joining side 10 is U-shaped in sections and L-shaped in sections, like FIG. 1 there is a defined stepless transition between the U-region and the L-region. Furthermore, a thickening 22 is provided. This type of thickening is moreover provided in the case of the embodiment according to FIG. 3.

In the case of the embodiment according to FIG. 3, in some sections there is a U-shape on the joining side 10, and in some sections an L-shape in cross section. The two joining shapes U and L are connected by a defined stepless transition. Furthermore, a thickening 22 similar to FIG. 2 is provided as well as a graduation 24 in the region 12. The thickening 22 comprises the graduation 24 in terms of volume.

The invention claimed is:

1. A replacement part for a gas turbine blade, comprising:
a section of a blade tip;
a section of at least one of a leading edge and a trailing edge of a blade; and
a joining side for welding to the gas turbine blade, wherein the joining side is on a side of the replacement part that is opposite from the section of at least one of the leading edge and the trailing edge of the blade and wherein the joining side has a section that is U-shaped in cross section; wherein the U-shaped cross-section is formed by a base which is flanked on two sides by flanges, wherein at least one of the flanges has a gradual thickening of a wall thickness in at least one region running in a longitudinal direction of the joining side as compared to at least one other region of the flange located in the longitudinal direction.

2. The replacement part according to claim 1, wherein the gas turbine blade is a blade of an aircraft engine.

3. The replacement part according to claim 1, wherein the joining side has a second section that is L-shaped in cross-section.

4. The replacement part according to claim 3, wherein the section that is U-shaped in cross section is essentially directly adjacent to the second section that is L-shaped in cross-section.

5. The replacement part according to claim 1, wherein at least one of the flanges in at least one region running in the longitudinal direction of the joining side as compared to at least one other region of the flange located in the longitudinal direction is longer in a direction extending transverse to the longitudinal direction and transverse to the base than in the at least one other region.

6. The replacement part according to claim 1, wherein the joining side runs straight along a longitudinal direction of extension.

7. A gas turbine blade, comprising:
   a remnant portion; and
   a replacement part according to claim 1 formed onto the remnant portion via a welded connection.

8. The gas turbine blade according to claim 7, wherein the joining side has a second section that is L-shaped in cross-section and wherein the second section is adjacent to a leading edge or a trailing edge of the gas turbine blade.

9. The gas turbine blade according to claim 7, wherein the at least one region of the flange forming the gradual thickening is adjacent to a leading edge or a trailing edge of the gas turbine blade.

10. A method for repairing a gas turbine blade, comprising the steps of:
   removing a portion of the gas turbine blade so that a blade remnant portion remains that is reduced by the removed portion, wherein the removed portion includes a section of a blade tip and a section of at least one of a leading edge and a trailing edge of the gas turbine blade;
   welding a replacement part to the blade remnant portion, wherein the replacement part includes:
   a section of a blade tip;
   a section of at least one of a leading edge and a trailing edge of a blade; and
   a joining side, wherein the joining side is on a side of the replacement part that is opposite from the section of at least one of the leading edge and the trailing edge of the blade and wherein the joining side has a section that is U-shaped in cross section, wherein the U-shaped cross-section is formed by a base which is flanked on two sides by flanges, wherein at least one of the flanges has a gradual thickening of a wall thickness in at least one region running in a longitudinal direction of the joining side as compared to at least one other region of the flange located in the longitudinal direction;
   wherein a welding direction when welding on the replacement part is such that welding is performed from a direction of the at least one of the leading edge and the trailing edge in a direction of the blade tip.

* * * * *